United States Patent
Coggio et al.

(10) Patent No.: US 10,822,518 B2
(45) Date of Patent: Nov. 3, 2020

(54) CURABLE COATING COMPOSITIONS USING SUCCINIC ACID

(71) Applicant: LCY BIOSCIENCES INC., Sarnia (CA)

(72) Inventors: William D. Coggio, Hudson, WI (US); Jan Hyrsl, Pardubice-Starocemsko (CZ); Daniela Vareckova, Sezemice (CZ)

(73) Assignee: LCY BIOSCIENCES INC., Sarnia, Ontario (CA)

( * ) Notice: Subject to any disclaimer, the term of this patent is extended or adjusted under 35 U.S.C. 154(b) by 110 days.

(21) Appl. No.: 15/759,960

(22) PCT Filed: Sep. 14, 2016

(86) PCT No.: PCT/US2016/051611
§ 371 (c)(1),
(2) Date: Mar. 14, 2018

(87) PCT Pub. No.: WO2017/048767
PCT Pub. Date: Mar. 23, 2017

(65) Prior Publication Data
US 2018/0258314 A1    Sep. 13, 2018

Related U.S. Application Data

(60) Provisional application No. 62/218,384, filed on Sep. 14, 2015.

(51) Int. Cl.
| | | |
|---|---|---|
| *C09D 167/02* | (2006.01) | |
| *C08G 63/16* | (2006.01) | |
| *C08G 18/42* | (2006.01) | |
| C08J 3/24 | (2006.01) | |
| C08K 5/13 | (2006.01) | |
| C08K 5/29 | (2006.01) | |
| C08K 5/3492 | (2006.01) | |
| C08L 63/04 | (2006.01) | |

(52) U.S. Cl.
CPC .......... *C09D 167/02* (2013.01); *C08G 18/42* (2013.01); *C08G 63/16* (2013.01); *C08J 3/247* (2013.01); *C08K 5/13* (2013.01); *C08K 5/29* (2013.01); *C08K 5/34922* (2013.01); *C08K 5/34924* (2013.01); *C08L 63/04* (2013.01)

(58) Field of Classification Search
CPC .......... C09D 167/02; C08J 3/247; C08K 5/13; C08K 5/29; C08K 5/34922; C08K 5/34924; C08L 63/04
See application file for complete search history.

(56) References Cited

U.S. PATENT DOCUMENTS

| | | |
|---|---|---|
| 3,678,128 A | 7/1972 | Riemhofer et al. |
| 2010/0076154 A1 | 3/2010 | Spilman et al. |
| 2015/0125643 A1* | 5/2015 | Takagi ............... B65D 25/14 |
| | | 428/35.8 |

OTHER PUBLICATIONS

PCT International Search and Written Opinion in related, co-pending PCT Application No. PCT/US2016/051611, dated Nov. 17, 2016.

* cited by examiner

*Primary Examiner* — Edward J Cain
(74) *Attorney, Agent, or Firm* — Thomas | Horstemeyer, LLP

(57) ABSTRACT

The present application relates to curable coating compositions which include greater than 10 mole % of succinic acid. The inclusion of succinic acid provides a quick cure rate, useful hardness, desirable gloss properties and low yellowing. Described are also processes for the preparation of the curable coating compositions, their curing methods and their use in the coating of surfaces.

15 Claims, 1 Drawing Sheet

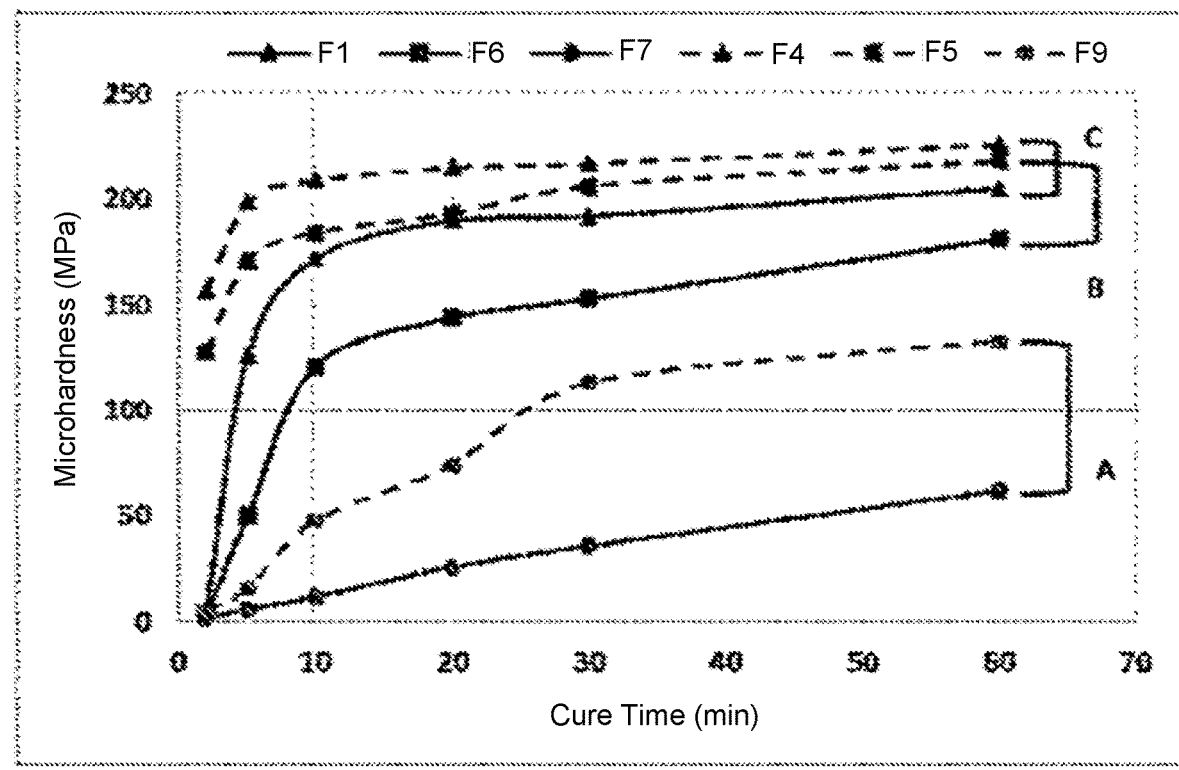

CURABLE COATING COMPOSITIONS USING SUCCINIC ACID

CROSS-REFERENCE TO RELATED APPLICATION

This application is the 35 U.S.C. § 371 national stage application of PCT Application No. PCT/US2016/051611, filed Sep. 14, 2016, where the PCT claims priority to U.S. provisional application No. 62/218,384 filed on Sep. 14, 2015, both of which are herein incorporated by reference in their entireties for all purposes.

TECHNICAL FIELD

The present application relates to curable coating compositions which include greater than 10 mole % of succinic acid. The inclusion of succinic acid provides a quick cure rate, useful hardness, desirable gloss properties and low yellowing. Described are also processes for the preparation of the curable coating compositions, and their use.

BACKGROUND

Bio-derived monomers are becoming commercially feasible due to improved methods of large scale production and purification. Succinic acid, a 4-carbon diacid, is one such monomer. While succinic acid is by no means a new chemical its high cost prevented it from being used in many applications. Succinic acid when used in unique formulations can provide unexpected properties that are commercially desirable.

Polyester resin made from succinic acid can be used, for example, in a curable coating for metal, wood, plastics, film glass and porous substrates such as concrete and ceramics. Typical polyesters are polymers with the organic linkage R'—C(O)—O—R derived from the condensation reaction typically between organic diacids or organic diesters, such as methyl or ethyl esters, and diols. The polymers have useful molecular weight ranges between 1000 and 30,000 g/mol. Typical polyester compositions for hard surfaces such as metals are comprised of organic diacids and polyacids such as isomers of the aromatic acids tere-, ortho-, and iso-phthalic acids (or phthalic anhydride), aliphatic and cycloaliphatic diacids such as C4-C12 dicarboxylic acids, cyclohexane dicarboxylic acids (1,2; 1, 3 and 1,4 cyclohexyl dicarboxylic acids), hexahydro dicarboxylic anhydride (HHDA), furan dicarboxylic acid, and other similar acids. Typical diols are 1,2-propylene glycol (PG), 1,3-propane diol (PDO), 1,4-butane diol (BDO), 2,2-dimethyl-1,3-propane diol (neopentyl glycol, NPG), and cyclic diols such as 1,3- or 1,4-cyclohexane dimethanol, and tetramethylcyclobutane diol. In addition, the polyesters useful in these coating technologies can contain branched structural moieties derived from the use of tri or tetra functional acids and glycols such as pyromellitic acid, citric acid, trimethylol propane, pentaerythritol and UV reactive functionalities such as itaconic acid, or derivatives made from acrylate such as hydroxyethyl acrylate or methacrylic acid anhydride. Polyester resins are synthesized in such a manner that the polymer chains consists of either residual hydroxy or acid end groups or branch points. These functional entities enable the polyesters to be crosslinked by numerous chemical reactions to further improve performance characteristics. Such crosslinking reactions consist of, but are not limited to, epoxy, urethane, (reaction of hydroxyl end groups with an isocyanate), melamines, UV crosslinking reactions and similar reactive chemistry which chemically bond to the polyester chains and improve the mechanical properties of the coatings and ultimately its durability and performance in use.

The polyester coatings on the metal substrates (typically aluminum and steel) provide numerous performance advantages, such as corrosion and solvent protection, enable customized performance or aesthetic features, which can modified textures to reduce mold, bacterial or fungal growth, or to improve the visual optics such as to make a matte, semi-gloss or gloss finished coatings. The polyester resins can also act as binders for other functional components such dyes, pigments, UV stabilizers, corrosion and rust inhibitors, adhesion promoters and magnetic or radar reflective nanoparticles, to improve the overall functionality of the coated surface.

SUMMARY

The curable coatings described herein contain diacids and the diacid content contains greater than 10 mole % succinic acid. These curable coatings provide at least one of fast cure rates, formulation latitude, greater mechanical flexibility, excellent adhesion, high gloss and yellowing resistance. The described polyester coatings are useful on metal substrates because they provide improved productivity and lower cure temperatures thus enabling energy savings. In particular with on-line coating systems such as those utilized for metal coil production.

Described herein are curable coating compositions comprising diacids, one of which is succinic acid. The curable coating compositions include a polyester made from succinic acid and at least one additional diacid. At least 10, 15, 20, 25, 30, 35, 40, 45, 50, 60, or 70 mole % of the diacid is succinic acid. The succinic acid can be derived from biomass. In some embodiments, the succinic acid is derived from fermentation exploiting the reverse tricarboxylic acid cycle.

Therefore, in some examples the polyester comprises additional diacids such as malate and fumarate. When present such additional diacids are typically present from 1 to about 5 percent of the succinic acid, and more typically from about 0.01 to about 2 percent of the succinic acid. These additional biologically produced diacids can enhance functionality. The polyester also includes at least one diol, a cross linking agent, a solvent as well as other additives known to one of ordinary skill in the art.

Cross-linking agents are useful for reacting and connecting multiple polyester chains together. Exemplary cross-linking agents include acrylates, epoxides, melamines, isocyanates, and isocyanurate. More specifically, cross-linking agents can be selected from bisphenol A, epoxy novalac resins, bisphenol F, triglycidylisocyanurate, hexamethoxymethylmelamine, tetramethoxymethylbenzoguanamine, tetramethoxymethylurea, mixed butoxy/methoxy substituted melamines, toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethylxylene diisocyanate, metaxylene diisocyanate, polyisocyanates, 1,4-butylene diisocyanate, methylene bis(4-cyclohexyl isocyanate), isophorone diisocyanate and isocyanate-terminated adducts of ethylene glycol, 1,4-butylene glycol, trimethylol propane and combinations thereof.

The curable coating described herein can include one or more solvents. The solvent can be selected from benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, or combinations thereof.

In addition to the succinic acid the curable coating composition can contain additional diacids. The diacids can be aliphatic, aromatic, cyclic or multifunctional. Exemplary aliphatic diacids include adipic acid, glutaric acid, fumaric acid, maleic acid, cyclohexane dicarboxylic acid, hexahydrophthalic acid or its anhydride, furan dicarboxylic acid, azeleic acid, sebacic acid, substituted maleic and fumaric acids such as citraconic, chloromaleic, mesaconic, and substituted succinic acids such as aconitic and itaconic. Exemplary aromatic diacids include phthalic anhydride, terephthalic acid, isophthalic acid, naphthalenic acid and combinations thereof.

The curable coating composition can also include multifunctional acids. Multifunctional refers to diacids that include R groups in addition to the two carboxylic acid groups, such as for example, additional carboxyl groups, amine and hydroxyl groups. Exemplary multifunctional diacids include trimellitic acid; pyromellitic acid; ethylene diamine tetracetic acid; tricarballylic acid; nitrilotriacetic acid, nitrilo diacetic monopropionic acid, butanetetracarboxylic acid, cyclopentanetetracarboxylic acid, citric acid, aconitic acid, trimesic acid, diethylene triamine pentaacetic acid and combinations thereof.

The polyester in the curable coating composition also includes at least one diol. The diol can be a linear or branched aliphatic, acyclic diol and/or a cyclic diol. The diol can also be aromatic. The diol can be a glycol. For example, the glycol can be neopentyl glycol; ethylene glycol; propylene glycol; neopentyl glycol hydroxypivalate diethylene glycol; methylene glycol; tetraethylene glycol; dipropylene glycol; polypropylene glycol; hexmethylene glycol or a combination thereof. Exemplary diols include 1,3-propane diol, 1,4-butane diol and 2-methyl-1,3-propane diol, 1,3- and 1,4-cyclohexane dimethanol.

The curable coating composition can be a non-crystalline solid or a liquid at room temperature.

The curable coating composition can also include multifunctional alcohols. Multifunctional alcohols can include R groups in addition to the two hydroxyl groups in the diol. The multifunctional alcohol can be a polyol having greater than two hydroxyl groups, for example, trimethanol propane triol, pentaerythritol and combinations thereof.

Exemplary curable coating compositions include succinic acid, isophthalic acid, 1,3-propane diol, and neopentyl glycol (NPG). The succinic acid can be present in a concentration of at least 10 mole % of the total diacid content. For example, when isophthalic acid is present it can be present at less than 80 mole %, or less than 70%, 60%, 50%, or even less than 40% of the total diacid concentration. In other examples, the ratio of succinic to isophthalic is between 1:4 and 1:1. In yet other examples, the ratio of succinic to isophthalic is between 1:3 and 1:2.

The succinic acid containing curable coating compositions described herein can, for example, display faster curing times than comparable curable coating compositions that do not contain succinic acid. Comparable curable coating compositions are compositions that contain adipic acid instead of succinic acid. Some of the curable coating compositions described hereinafter curing for 10 minutes achieve at least 110%, 120%, 130% or 140% of the hardness values achieved by a curable coating composition consisting of adipic and isophthalic. The succinic acid containing curable coating compositions can cure to a hardness of at least 50 Megapascals in 60 minutes, or at least 75 Megapascals in 30 minutes, as determined by surface microhardness.

One of ordinary skill in the art will appreciate that the curable coating compositions described herein can be used to coat any surface. The coatings are particularly useful for coating metal. The coating can be glossy and can retain their glossy appearance even after exposure to the environment. In some exemplary embodiments, the 60 degree gloss measurement can be greater than 70, 80 or even 90. The coating can also display resistance to yellowing. In some instances the coatings display a yellowness of less than 0.8, 0.75 or −0.7 b* as scaled to the CIE Color Scale.

A process of making the curable coating composition is also described. The process is more efficient because of the relatively shortened curing times required, thus minimizing the energy required for heating during curing. In some instances, the heating step can be less than 30, 45 or 60 minutes.

DESCRIPTION OF THE FIGURES

FIG. 1 shows the variation in Microhardness of various exemplary formulations as a function of curing time.

DETAILED DESCRIPTION

The present composition includes a curable polyester, a cross-linking agent, and a solvent. As used herein, the term "polyol" means a compound with at least 2 hydroxyl groups. As used herein, the term "diol" means a compound with 2 hydroxyl groups. As used herein, the term "polyacid" means a compound with at least 2 carboxylic acid groups, and the term "diacid" means a compound with 2 carboxylic acid groups.

Polymers comprising a polyester unit are usually prepared from the condensation of monomers comprising a diacid and/or a polyacid and a diol and/or a polyol. Polyesters which may be employed in the present coating formulations include succinic acid, isophthalic acid, 1,3-propane diol, and neopentyl glycol (NPG). The total diacid content can comprise at least 10 mole % of succinic acid. For example, when isophthalic acid is present it can be present at less than 80 mole % of the total diacid concentration. In other examples, the ratio of succinic to isophthalic is between 1:4 to 1:1. In yet other examples, the ratio of succinic to isophthalic is between 1:3 and 1:2.

Preferred polyesters advantageously exhibit a number average molecular weight of at least about 1,000, preferably from about 2,000 to about 10,000, and most preferably from about 2,500 to about 7,500. In one embodiment, the number average molecular weight is at least about 4,000. The glass transition temperature, or Tg, of the polyester advantageously is from about −20° T to about 100° C., preferably is from about −10° C. to about 90° C., and more preferably is from about 0° C. to about 60° C. The preferred polyesters generally have a Tg of less than about 55° C. The polyester preferably is a viscous liquid at 25° C. For the purposes of the present application, Tg is measured by differential scanning calorimetry.

The hydroxyl number of the polyester advantageously is less than about 150 mg KOH/g. Preferably, the hydroxyl number of the polyester is from about 10 to about 100 mg KOH/g. More preferably, the hydroxyl number of the polyester is from about 20 to about 70 mg KOH/g. Most preferably, the hydroxyl number of the polyester is from about 30 to about 50 mg KOH/g. The polyester of the present application advantageously has no more than about 2 hydroxyl groups per molecule.

The amount of polyester employed in the coil coating composition advantageously is from about 20 to about 90 weight percent, based on the weight of polyester, cross-linker and solvent in the composition, preferably, is from about 25 to about 75 weight percent, and most preferably is from about 30 to about 65 weight percent. The above-described polyol is optionally employed in conjunction with one or more additional polyols. In one embodiment, the additional polyol generally contains more than 2, preferably 2 to about 10 carbon atoms, more preferably about 2 to 8 carbon atoms, in addition to having 2 to about 6, preferably 2 to about 4, hydroxyl groups. Some preferred examples of the additional polyols are one or more of the following: neopentyl glycol; ethylene glycol; propylene glycol; 1,4-butanediol; 1,6-hexamethylenediol; 1,2-cyclohexane dimethanol; trimethylol propane; pentaerythritol; neopentyl glycol hydroxypivalate diethylene glycol; Methylene glycol; tetraethylene glycol; dipropylene glycol; polypropylene glycol; and like compounds apparent to those skilled in the art; and mixtures thereof.

The polyol composition can advantageously include at least one polyol having at least 3 hydroxyl groups. In one embodiment, the amount of this compound is from about 0.1 to about 5 weight percent, based on the weight of the polyol composition. Exemplary multifunctional polyols include trimethanol propane triol, pentaerythritol and combinations thereof.

In one embodiment, termination of the polyester molecules by hydroxy-containing monomers is provided by using a molar excess of the diol in the polyester-forming reaction. In another embodiment, termination is provided by incorporating a monofunctional acid or alcohol into the polymerization mixture. In another embodiment, termination of the polyester molecules by carboxyl-containing monomers is provided by using a molar excess of a di- or tri-carboxylic acid in the polyester-forming reaction.

As is well known to those skilled in the art, the esterification reactions are normally carried out at temperatures of from about 140° to about 260° C., or even up to about 300° C., for a period of time ranging from about 3 to about 15 hours, with or without the use of acidic esterification catalysts such as phosphorous acid or p-toluenesulfonic acid present at a level of about 0.01 up to about 2.0 wt. %. The reaction is optionally carried out in the presence of a solvent. In one embodiment, the reaction is conducted in the substantial absence of a solvent. When present, the solvent is preferably an aromatic hydrocarbon. The esterification may be carried out using a single or multi-stage process.

Amino-crosslinking agents which are useful in preparing thermoset coating formulations are those materials which will classically react with the hydroxyl terminal groups of the polyester. Such materials are well known to those skilled in the art. Suitable materials include, for example, butylated or methylated urea-formaldehyde resins, butylated melamineformaldehyde resins, hexamethoxymethyl-melamine or mixtures of various hydroxymethyl-melamine-methyl ethers such as the pentamethyoxymethylmelamine and the tetramethoxymethyl melamines, and high-amino/polymeric melamines. The hydroxymethylmelamine and hydroxymethyl ureas may also be etherified with alcohols other than methyl or butyl such as ethyl, propyl, isobutyl and isopropyl. Mixtures of crosslinking agents can be employed.

The amount of crosslinking agent on a weight basis incorporated into the final coating composition advantageously is from about 2 up to about 35% by weight, based on the combined weight of polyester, cross-linking agent and solvent present in the coating composition. The most preferred level of addition is from about 3 to about 20% by weight.

The lower the molecular weight of the polyester polymer, the larger the number of terminal hydroxy groups present and the larger the quantity of crosslinking agent required to properly cure the resin. Conversely, the higher the molecular weight of the polyester polymer, the fewer the number of terminal hydroxy groups and the lesser the quantity of crosslinking agent is required to properly cure the resin.

Advantageously, the composition as described herein is employed as a solution in a solvent. The solvent can be any solvent which will dissolve or disperse the polyester and the cross-linking agent. The same or different solvent(s) which are optionally used during the synthesis of the polyester to dissolve reactants may also be added during the formulation of the coating composition to adjust viscosity so as to provide a formulation suitable for coating, the coating composition preferably having a viscosity of from about 10 centipoise to about 10 poise. In many cases, a single solvent is used to solubilize the system. However, in other cases it is often desirable to use mixtures of solvents in order to effect the best solubilization and coating behavior of the mixture. In particular, a combination of an aromatic solvent with an oxygenated solvent is preferred. Suitable aromatic solvents include toluene, xylene, ethylbenzene, tetralin, naphthalene, and solvents which are narrow cut aromatic solvents comprising C6 to C13 aromatics such as those marketed under the trade name Hydrosol™ A200 ND supplied by DHC Solvent Chemie GmbH Germany. The oxygenated solvents should not be extremely polar such as to become incompatible with the aromatic solvents. Suitable oxygenated solvents can be selected from the following classes: alcohols, ketones, ethers, ether-alcohols, and ether-esters, or any mixture of these. Examples of suitable oxygenated solvents include propylene glycol monomethyl ether acetate, propylene glycol propyl ether acetate, ethoxypropionate, dipropylene glycol monomethyl ether acetate, propylene glycol monomethyl ether, propylene glycol monopropyl ether, dipropylene glycol monomethyl ether, diethylene glycol monobutyl ether acetate, ethylene glycol monoethyl ether acetate, ethylene glycol monobutyl ether acetate, ethylene glycol monoethyl ether, ethylene glycol monobutyl ether, diethylene glycol monoethyl ether, and diethylene glycol monoethyl ether acetate. This list should not be considered as limiting, but rather as examples of solvents which are useful in the present compositions. The type and concentration of solvents are generally selected to obtain formulation viscosities and evaporation rates suitable for the application and baking of the coatings. Typical solvent concentrations in the formulations range from about 5 to about 75% by weight with a preferred range of from about 7 to about 50% by weight and a most preferred range of from about 10 to about 40% by weight.

Acid catalysts may be used to cure systems containing hexamethoxymethyl melamine and other amino crosslinking agents, and a variety of suitable acid catalysts are known to one skilled in the art for this purpose, and are optionally employed in the composition. These include, for example, p-toluenesulfonic acid, methanesulfonic acid, nonylbenzenesulfonic acid, dinonylnapthalenedisulfonic acid, dodecylbenzenesulfonic acid, phosphoric acid, mono and dialkyl acid phosphate, butyl phosphate, butyl maleate, and the like or a compatible mixture of them. These acid catalysts may be used in their neat, unblocked form or combined with suitable blocking agents such as amines. Typical examples are available from, e.g. Cytec Industry under the tradename Cycat™.

In some cases, carboxylic acids can be used as catalysts for the crosslinking reaction. At the higher temperatures used for coil coating, the activity of the residual carboxylic groups on the backbone polymer can sometimes provide sufficient catalysis to promote the crosslinking reaction. The amount of catalyst employed typically varies inversely with the severity of the baking schedule. In particular, smaller concentrations of catalyst are usually required for higher baking temperatures or longer baking times. Typical catalyst concentrations for coil coating applications would be about 0.1 to about 2.0 wt. % catalyst solids based on the weight of binder (polymer plus crosslinking agent solids), more preferably from about 0.5 to about 1.0 wt. %. For certain catalysts, such as phosphoric acid and phosphate esters, an even wider range of catalyst concentration up to 3% or more can be used and would be known to one skilled in the art.

For formulations containing hexamethoxymethyl melamine as the crosslinking agent and p-toluene sulfonic acid as the catalyst, preferred curing conditions at dry film thickness of about 2 mil, are catalyst concentration between about 0.1 and 0.6 wt. % based on binder, cure temperatures from 100° C. to about 200° C., more preferably from about 120° C. to about 160° C. and baking time between about 1 min to about 60 minutes.

The quantity of catalyst used also has an upper practical limit. While increasing catalyst helps to increase crosslinking, an excess of catalyst can be detrimental. Residual catalyst in the finished coating can catalyze undesirable degradation reactions. The upper limit of the catalyst also depends on the coating used, and on the specific application.

The polyester coating compositions herein described may have excellent flexibility and hardness and can be specifically formulated with high loadings of pigment, generally at a weight ratio within the range of from about 1.25 to 1 up to about 5.0 to 1 pigment to polymer solids ratio. Suitable pigments which may be included in the compositions are those opacifying pigments normally used in coil coating formulations and include titanium dioxide ($TiO_2$), zirconium oxide, zircon, zinc oxide, iron oxide, antimony oxide, carbon black, as well as chrome yellows, greens, oranges and the like. Preferred pigments include rutile $TiO_2$ and particularly weather resistant coated types of $TiO_2$. The pigments may also be blended with a suitable extender material which does not contribute significantly to hiding power. Suitable extenders or fillers include silica, barite, calcium sulfate, magnesium silicate (talc), aluminum oxide, aluminum silicate, calcium silicate, calcium carbonate, mica, potassium aluminum silicate and other clays or clay-like materials. The more preferred pigment/extender to binder weight loading ratios lie within the range of from about 1.5 to about 5.0, more preferably from greater than about 2.0 to about 4.75, and most preferably from about 2.25 to about 4.5 parts of pigment, or pigments and extender mixture, per part of binder.

The coil coating composition can comprise conventional additives such as anti-settling agents, anti-foaming agents, wetting agents, leveling agents, reactive diluents, plasticizers, thickeners, rheology and/or surface modifiers, UV absorbers, catalysts for crosslinking, and the like, para-toluene sulfonic acid being particularly effective for catalysts of hydroxy-melamine crosslinking. These conventional additives can be employed according to techniques well known to those skilled in the art. The coating compositions may be applied to substrates by any suitable conventional technique such as spraying, roller coating, dip coating and the like. The coating composition is applied in liquid form.

The solids content of the coating composition can vary widely at the discretion of the user. Advantageously, the coating composition has a solids content of from about 25 to about 95 weight percent. In one embodiment, the present coating composition has a solids content of less than about 85% by weight. In one embodiment, the coating composition has a solids content of at least about 50% by weight, and in a preferred embodiment, the composition has a solids content of at least about 75% by weight.

For formulations containing hexamethoxymethyl melamine as the crosslinking agent and p-toluene sulfonic acid as the catalyst, preferred curing conditions at dry film thickness of about 2 mil are catalyst concentration between about 0.1 and 0.6 wt. % based on binder, curing temperatures from 100° C. to about 200° C., more preferably from about 120° C. to about 160° C. and baking time between about 1 min to about 60 minutes. However, satisfactory baking schedules for the present formulations vary widely including, but not limited to, lower temperature bakes with reaction times greater than 1 hr to shorter temperature bakes at higher temperatures, the particular baking schedules being dictated by the specific application, thickness of the coating, solvent combinations and size and weight of the part. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application.

The following is to be construed as merely illustrative, and not limitations of the preceding disclosure in any way whatsoever. Those skilled in the art will promptly recognize appropriate variations from the procedures both as to reactants and as to reaction conditions and techniques. In some cases, starting materials or intermediates may be commercially available.

EXAMPLES

Example 1—Polyester Resin Preparation Procedure

The polyester resins were prepared using a typical polyester condensation reaction process familiar to one skilled in the art. The resin compositions described in Table 1, were made using a 1.5 L reaction flask equipped with a thermocouple and thermoregulator, heating mantel, and air driven anchor blade agitator. The flask was equipped with an addition funnel, cooling condenser and nitrogen inlet.

Glycols were charged to the flask under stirring and a positive nitrogen flow of ~10 l/h. The mixture was heated up to 110° C. and dibutyl tin laurate (0.5% based on moles of acid added) and acids were added during heating at this temperature to form a cloudy mixture of acid and glycols. The nitrogen flow was increased to 25 l/h and was aggressively bubbled into the mixture for 10 minutes to purge air from the reaction mixture. After this time, the nitrogen flow was reduced to the normal flow of 10 l/h and the reaction temperature was increased to 150-160° C. when the initial condensate was observed to form in the cooling condenser and the reaction mixture was further heated over several hours to a final reaction temperature of 220-230° C.

During this time the acid and glycol mixture was noted to become clear and homogenous in the temperature range of approximately 215-225° C. The first sample for determination of acid value (AV), hydroxyl value (OHV) and viscosity cone and plate rheometer (CAP) of the polyester was taken after reaching the temperature 220° C. If glycol loss was detected, the concentration was adjusted by addition of ethylene glycol to maintain the required hydroxyl excess (delta=OHV−AV~44). Additional resin samples were taken in hour intervals for determination of the acid value and viscosity. The reaction was continued at 225° C. until an acid value of less than 5 mg KOH·g$^{-1}$ was obtained. After this AV was obtained, the reaction mixture was cooled down to approximately 150-170° C. The reaction mixture was then diluted with Hydrosol A 200 ND (non-volatile component, NVC approximately 75%) to form a resin solution having approximately 75% solids and further cooled to room temperature. The resin solution was then further diluted with butyl glycol, which was added in an amount of 20% w/w to obtain a solvent content of about 7% w/w butyl glycol in the resin solution. The final solid content of the resin solution was adjusted to 65% solids (non-volatile content) using Hydrosol™ A 200 ND.

Table 1 summarizes molar content of the components for comparative resins F1 and for those resins containing succinic acid. The final coating formulations were cured using Cymel™ 303 and Cycat™ 4100 available from Cytec. The different resins were formulated, coated and cure in the same manner. Details are shown in the experimental section.

TABLE 1

Polyester resin formulations

| | F1 | F2 | F3 | F4 | F5 | F6 | F7 | F8 | F9 |
|---|---|---|---|---|---|---|---|---|---|
| Amount (g) | | | | | | | | | |
| Isophthalic Acid (IPA) 525 | 525 | 528.5 | 536 | 525 | 476 | 490 | 388.82 | 383 | 412 |
| Adipic Acid (AA) | 153.9 | 116.2 | 36.9 | 0 | 0 | 99.7 | 81.44 | 225 | 0 |
| Succinic Acid (SA) | 0 | 31.3 | 95.3 | 124 | 182.64 | 107.1 | 184.26 | 65 | 265.6 |
| Total Moles Acid | 4.21 | 4.25 | 4.31 | 4.21 | 4.42 | 4.54 | 4.46 | 4.4 | 4.73 |
| 1,2 propylene Glycol (PG) | 335.7 | 338 | 341.8 | 335.7 | 350.7 | 360.5 | 355.19 | 350 | 376 |
| Neopentyl Glycol (NPG) | 85.4 | 85.9 | 87.2 | 85.4 | 89.8 | 92.4 | 90.3 | 89 | 95.8 |
| Total Moles Glycol | 4.6 | 4.63 | 4.69 | 4.6 | 4.82 | 4.95 | 4.87 | 4.79 | 5.16 |
| Relative mol % acid | | | | | | | | | |
| Isophthalic Acid (IPA) | 75 | 75 | 75 | 75 | 65 | 65 | 52.5 | 52.5 | 52.5 |
| Adipic Acid (AA) | 25 | 18.75 | 6.25 | 0 | 0 | 15 | 12.5 | 35 | 0 |
| Succinic Acid (SA) | 0 | 6.25 | 18.75 | 25 | 35 | 20 | 35 | 12.5 | 47.5 |

Example 2—Physical Properties of Resins

The following analytical methods were used for determination of the physical properties (results in Table 2 below).

| Analytic method | Standard |
|---|---|
| Acid value | ISO 2114-2000 |
| Hydroxyl value | Synpo's testing method according to DIN 53240 |
| $T_g$ by DSC | ISO 11357-2008 |
| Softening point R&B method | ISO 4625-2004 |
| Viscosity (LV) | ISO 2555-2004 |
| Non-volatile content | Synpo's testing method based on ISO 3251-2000 |

TABLE 2

Physical properties of the polyester resins

| | F1 | F2 | F3 | F4 | F5 | F6 | F7 | F8 | F9 |
|---|---|---|---|---|---|---|---|---|---|
| Resin Properties | | | | | | | | | |
| Acid Value (mg KOH/g) | 4.2 | 4 | 3.2 | 3 | 4 | 28 | 3.4 | 4 | 3.8 |
| OH Value (mg KOH/g) | 44.8 | 41.4 | 40.9 | 40.7 | 43.1 | 42.4 | 44.2 | 44.7 | 42.4 |

TABLE 2-continued

Physical properties of the polyester resins

|  | F1 | F2 | F3 | F4 | F5 | F6 | F7 | F8 | F9 |
|---|---|---|---|---|---|---|---|---|---|
| Viscosity |  |  |  |  |  |  |  |  |  |
| Viscosity Resin (P, CAP 140° C.) | 25 | 29 | 37.2 | 43.5 | 25.4 | 20.7 | 10.5 | 8.4 | 14.2 |
| Solution Viscosity (Brookfield, CPS, 25° C. 65% Solids) | 2850 | 4260 | 5010 | 5580 | 4380 | 2670 | 1980 | 1140 | 2550 |
| Glass temp (Tg) | 15.8 | 18.5 | 23.1 | 29 | 18.7 | 11.4 | 2.5 | 3 | 8.7 |

Example 3—Preparation of Films for Mechanical Properties

The curable polyester coating formulations were prepared by mixing the polyester resin solution and the hardener/cross-linker Cymel™ 303 in a ratio of 7:3 based on 100% solids of particular components and were thermally cured using Cycat™ 4040 added in amount of 1% w/w to solids. The wet coatings were prepared from a 65% solids solutions by use of Meyer Rod or Byrd Bar on glass or metal substrate as dictated by the desired tests. The wet coating thickness was ~150 um and the solvent was removed and the coatings cured at 140° C. for 1 hr to produce cured coatings a thickness of ~60 um. The coatings were characterize using standardize ISO characterization methods.

Example 4—Test Methods for Cure Coating Compositions (i) ISO 1519:2011 (Paints and Varnishes Bend Test (Cylindrical Mandrel)

This method specifies an empirical test procedure for assessing the resistance of a coating of paint, varnish or related product to cracking and/or detachment from a metal or plastics substrate when subjected to bending round a cylindrical mandrel under standard conditions. The method determines the diameter of the first mandrel over which the coating cracks and/or becomes detached from the substrate.

(ii) ISO 1520:2006 (Paints and Varnishes Cupping Test)

This method specifies an empirical test procedure for assessing the resistance of a coating of paint, varnish or related product to cracking and/or detachment from a metal substrate when subjected to gradual deformation by indentation under standard conditions. The method determines the minimum depth at which the coating cracks and/or becomes detached from the substrate.

(iii) ISO 2409:2013 (Paints and Varnishes—Cross-Cut Test)

This International Standard specifies a test method for assessing the resistance of paint coatings to separation from substrates when a right-angle lattice pattern is cut into the coating, penetrating through to the substrate. The property determined by this empirical test procedure depends, among other factors, on the adhesion of the coating to either the preceding coat or the substrate. This procedure is not to be regarded, however, as a means of measuring adhesion.

(iv) ISO 16474-3:2013 Paints and Varnishes—Methods of Exposure to Laboratory Light Sources—Part 3: Fluorescent UV Lamps This method details methods for exposing coatings to fluorescent UV lamps, heat and water in apparatus designed to reproduce the weathering effects that occur when materials are exposed in actual end-use environments to daylight, or to daylight through window glass. Sprayed enamels on metal substrates were conditioned at the temperature (23±2) ° C. and relative humidity (50±5) % for 16 hours before testing.

The samples were placed into QUV/solar eye Weathering Tester (Q-Lab Corporation, USA). The exposition cycle consists of two phases that change regularly: exposure phase for eight hours under UVA-340 at 60° C., condensation phase for four hours at 50° C. Used fluorescent lamp: UVA-340 of radiation energy 0.89 W/m$^2$/nm at 340 nm.

The measurement of Paint coordinates and Paint variations was carried out by the spectral Colorimeter X-Rite SP 62 according to the ASTM E1347 in the color space CIE Lab 1976 with the d/8° diffuse geometry, the D65/10° illumination and specular gloss component.

Highly polished black glass was used as a standard; 91.6 specular gloss for the angle of 20°, to 94.7 for the angle of 60° and 99.5 for the measurement angle of 85°.

The 60° gloss measurements were recorded and were calculated from the average of six measurements on one sample sheet.

(v) Micro Hardness Tests

The micro hardness was measured by the use of a FISCHERSCOPE HM2000 hardness tester. The FISCHERSCOPE system measures the Martens Hardness according to ISO 14577. The hardness is determined from the area of indenter displacement under load. The indentation depth and a constant, specific to each indenter, are used to calculate the area of the indenter displacement. The test conditions were: Load 5 mN, Loading time 20 s, Hold duration at test load 5 s, Unloading time 20 s. The results are shown in Tables 3 and 5.

(vi) Cured Coatings (Cured with Cymel™ 303, 1 hr, 140° C.)

These data show that bio-SA in polyester formulations enable coatings with excellent coating properties. Even with lower levels of IPA, the coating properties are similar to the control F1. The physical properties of the cured coatings are summarized Table 3.

TABLE 3

Physical properties of the cured coating compositions

| Cured Coatings Performance | Test Method | F1 | F2 | F3 | F4 | F5 | F6 | F7 | F8 | F9 |
|---|---|---|---|---|---|---|---|---|---|---|
| Micro Hardness (MPa) | ISO 14577-1 | 203 | 205 | 219 | 206 | 205 | 157 | 54 | 11 | 125 |

TABLE 3-continued

Physical properties of the cured coating compositions

| Cured Coatings Performance | Test Method | F1 | F2 | F3 | F4 | F5 | F6 | F7 | F8 | F9 |
|---|---|---|---|---|---|---|---|---|---|---|
| MEK Rub Test (min) | ASTM D4752 | >5 | >5 | >5 | >5 | >5 | >5 | >5 | >5 | >5 |
| Flexural Bend (mm) | ISO 1519 | <3 | <3 | <3 | <3 | <3 | <3 | <3 | <3 | <3 |
| Erichsen (Cupping test) | ISO 1520 | >8 | 7.9 | 7.8 | >8 | 8 | 8 | 7.5 | 8 | 8 |
| Impact Test-Reverse | ISO 6272 | 100 | 100 | 100 | 100 | 100 | 100 | 100 | 100 | 100 |
| Impact Test-Front | ISO 6272 | 100 | 100 | 100 | 100 | 100 | 100 | 100 | 100 | 100 |
| Adhesion (degree) |  | 0 | 0 | 0 | 1 | 0 | 0 | 0 | 0 | 0 |

(vii) Corrosion Testing

Neutral salt spray corrosion testing was conducted in compliance with ISO 4628 using the cured coating compositions prepared as described above. The coating compositions were cured on untreated steel panels (no passivation layer) using a neutral salt spray of 5% w/v (NaCl) held at a pH of 6.8. The exposure cabinet was held constant at 35° C. The test specimen were evaluated at 2, 4, 7 days for the degree of blistering (EN ISO 4628-2), rusting (EN ISO 4628-3), cracking (EN ISO 4628-4) and flaking (EN ISO 4628-5). The results are listed in Table 4.

TABLE 4

Corrosion Resistance of Cured Compositions

| Sample name | IPA/SA Content | Blistering grade | Rusting grade | Cracking grade | Flaking grade | Delamination around a scribe (grade) |
|---|---|---|---|---|---|---|
| F1_Control | 75% IPA 0% SA | 4 | 4 | 0 | 0 | <0.5 |
| F4 | 75% IPA 25% SA | 3.5 | 3.5 | 0 | 0 | <0.5 |
| F6 | 65% IPA 35% SA | 4 | 3.5 | 0 | 0 | <0.5 |
| F9 | 53% IPA 47% SA | 4 | 4 | 0 | 0 | <0.5 |

These data suggest that the Bio-based SA does not negatively impact the corrosion resistance of the steel plate coated with a polyester coating, even with lower levels of IPA in the formulation and substantiate the claim that excellent coating performance can be obtained with bio-based SA at low levels of IPA. These data are the numerical average of the corrosion ratings obtained from 4 panels of each formulation.

(viii) Influence of Cure Rate and Hardness

A potential drawback of low IPA content formulations is the loss of hardness. High hardness is a key performance property for coatings since it protects the surface from chemical, oxidative and UV degradation. The change in hardness as a function of IPA and SA content shows the SA impacts the final hardness of the coating at fixed IPA level and also increase the rate of hardness build up as the SA replaces the AA content. The variation in Microhardness as a function of curing time for the different formulations is also presented in FIG. 1.

TABLE 5

Change in Micro Hardness with cure time

| | | | Micro hardness (MPa) | | | | | |
|---|---|---|---|---|---|---|---|---|
| % IPA | % SA | % AA | 2 min | 5 min | 10 min | 20 min | 30 min | 60 min |
| Relative mole % | | | | | | | | |
| F1 | 75 | 0 | 25 | 5 | 126 | 172 | 190 | 192 | 205 |
| F4 | 75 | 25 | 0 | 157 | 199 | 209 | 215 | 217 | 226 |
| F5 | 65 | 35 | 0 | 128 | 171 | 184 | 193 | 206 | 218 |
| F6 | 65 | 20 | 15 | 4 | 50 | 121 | 144 | 153 | 181 |
| F7 | 52.5 | 35 | 12.5 | 2 | 6 | 12 | 26 | 36 | 62 |
| F9 | 52.5 | 47.5 | 0 | 5 | 16 | 48 | 74 | 113 | 133 |

(ix) Preparation of Pigmented Coating Formulations

Curable coating formulations were prepared from polyesters resin F1, F4, and F9 as described above. The curable coating formulations were made with 15 wt % TiO$_2$ dispersed in the coating formulations. The pigment was uniformly dispersed using a high speed agitator with a dispersing blade at 1300 rpm until a consistent dispersion as determined by the fineness of grind was observed. Once the pigment was adequately dispersed to ensure a good coating quality, the coating solutions were prepared as before and cured at 140° C. for 60 min (typically 20 min of mixing). The curing conditions were modified to ensure a consistent high quality pigmented surface. These coated panels were initially cured at 100° C. for 60 minutes followed by curing at 140° C. (30 minutes). The cure coating compositions were subjected to Q-UV accelerating testing according to ISO 16474-3 2013. The change in weathering (Table 6) and change in mechanical properties (Table 7) were observed and reported after 1000 hrs of testing.

TABLE 6

| | Gloss (60°) | | | b* Yellowness | | |
|---|---|---|---|---|---|---|
| | Initial | 1000 hrs | Delta Gloss | Initial | 1000 hrs | Delta b* |
| F1 | 92 | 66 | 26 | 0.77 | 1.02 | 0.25 |
| F4 | 96 | 72 | 24 | 0.60 | 0.84 | 0.24 |
| F9 | 94 | 70 | 24 | 0.91* | 0.94 | 0.03 |

TABLE 7

| | Flex Test | | Cross Cut Adhesion | | Reverse Impact | | Cupping Test | |
|---|---|---|---|---|---|---|---|---|
| | Initial | 1000 hrs | Initial | 1000 hrs | Initial | 1000 hrs | Initial | 1000 hrs |
| F1 | <3 mm | <3 mm | No Change | | 100 | 10 | >8 mm | >8 mm |
| F4 | <3 mm | <3 mm | No Change | | 100 | <5 | >8 mm | >8 mm |
| F9 | <3 mm | <3 mm | No Change | | 100 | <5 | >8 mm | >8 mm |

* the yellowness value is not believed to be accurate due to its lack of change over time.

Although the invention has been illustrated and described with respect to one or more implementations, equivalent alterations and modifications will occur to others skilled in the art upon reading and understanding this specification. In addition, while a particular feature of the invention may have been disclosed with respect to only one of several implementations, such feature may be combined with one or more other features of the other implementations as may be desired and advantageous for any given or particular application.

Accordingly, it is understood that the examples and embodiments described herein are for illustrative purposes only and that various modifications or changes in light thereof will be suggested to persons skilled in the art and are to be included within the spirit and purview of this application and scope of the appended claims. Any publication, document, patent, patent application or publication referred to herein should be construed as incorporated by reference each in their entirety for all purposes.

The invention claimed is:

1. A curable coating composition comprising a mixture of:
   (a) a curable polyester prepared from the condensation of diacid monomers and polyol monomers wherein the diacid monomers comprise at least 10 mol % succinic acid and less than 80 mol % isophthalic acid, the molar ratio of succinic acid to isophthalic acid being from 1:4 to 1:1 and wherein the polyol monomers consist of a combination of neopentyl glycol and 1,2-propylene glycol;
   (b) a cross-linking agent; and
   (c) a solvent.

2. The curable coating composition of claim 1, wherein the cross-linking agent is selected from the group consisting of acrylates, epoxides, melamines, isocyanates, and isocyanurates.

3. The curable coating composition of claim 1, wherein the cross-linking agent is selected from the group consisting of bisphenol A, epoxy novalac resins, bisphenol F, triglycidylisocyanurate, hexamethoxy-methylmelamine, tetramethoxymethylbenzoguanamine, tetramethoxymethylurea, mixed butoxy/methoxy substituted melamines, toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, methylene bis (4-cyclohexyl isocyanate), isophorone diisocyanate and isocyanate-terminated adducts of ethylene glycol, 1,4-butylene glycol, trimethylol propane and combinations thereof.

4. The curable coating composition of claim 1, wherein the solvent is selected from the group consisting of benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, and combinations thereof.

5. The curable coating composition of claim 1, wherein the polyester is a non-crystalline solid or liquid at room temperature.

6. The curable coating composition of claim 1, further comprising a polyol comprising greater than two hydroxyl groups.

7. The curable coating composition of claim 6, wherein the polyol is trimethanol propane triol, pentaerythritol or combinations thereof.

8. The curable coating composition of claim 1, wherein the composition cures to a microhardness of at least 50 Megapascals in 60 minutes.

9. The curable coating composition of claim 1, wherein the composition after 10 minutes achieves a hardness that is greater than the hardness achieved by a curable coating composition comprising adipic and isophthalic acids.

10. The curable coating composition of claim 9, wherein the composition after 10 minutes achieves at least 110% of the hardness achieved by a curable coating composition consisting of adipic and isophthalic acids.

11. A coil coated with the curable coating composition as defined in claim 1.

12. A surface coated with the curable coating composition as defined in claim 1.

13. The surface of claim 12, wherein the coated surface is glossy.

14. The surface of claim 12, wherein the coated surface has a yellowness of less than 0.8 b.

15. A process of curing the curable coating composition as defined in claim 1, comprising: heating the curable coating formulation for less than 60 minutes.

* * * * *